United States Patent
Cardwell et al.

(10) Patent No.: US 7,900,096 B2
(45) Date of Patent: Mar. 1, 2011

(54) FREEING A SERIAL BUS HANG CONDITION BY UTILIZING DISTRIBUTED HANG TIMERS

(75) Inventors: Bryan N. Cardwell, Tucson, AZ (US); Michael L. Harper, Tucson, AZ (US); Craig A. Klein, Tucson, AZ (US); Gregg S. Lucas, Tucson, AZ (US); Mary Anne J. Marquez, Tucson, AZ (US); Robert E. Medlin, Tucson, TX (US)

(73) Assignee: International Business Machines Corporation, Armonk, NY (US)

( * ) Notice: Subject to any disclaimer, the term of this patent is extended or adjusted under 35 U.S.C. 154(b) by 225 days.

(21) Appl. No.: 12/354,389

(22) Filed: Jan. 15, 2009

(65) Prior Publication Data

US 2010/0180162 A1    Jul. 15, 2010

(51) Int. Cl.
*G06F 11/00* (2006.01)
(52) U.S. Cl. .......................................... 714/56
(58) Field of Classification Search ............... 714/56
See application file for complete search history.

(56) References Cited

U.S. PATENT DOCUMENTS

| | | | |
|---|---|---|---|
| 5,819,053 A | 10/1998 | Goodrum et al. | |
| 5,894,583 A * | 4/1999 | Johnson et al. | 710/48 |
| 6,453,429 B1 | 9/2002 | Sadana | |
| 6,510,529 B1 * | 1/2003 | Alexander et al. | 714/11 |
| 6,725,396 B2 | 4/2004 | Ahrens et al. | |
| 6,782,489 B2 * | 8/2004 | Fleming | 714/11 |
| 6,952,753 B2 * | 10/2005 | Ralphs | 711/111 |
| 7,665,011 B2 * | 2/2010 | Tseng et al. | 714/798 |
| 2002/0032820 A1 * | 3/2002 | Jahnke et al. | 710/240 |
| 2006/0085699 A1 * | 4/2006 | Hathorn et al. | 714/56 |
| 2009/0006889 A1 * | 1/2009 | Holdaway et al. | 714/9 |

* cited by examiner

*Primary Examiner* — Bryce P Bonzo
(74) *Attorney, Agent, or Firm* — Dillon & Yudell LLP

(57) ABSTRACT

A method for automatically detecting and correcting one or more hang conditions within one or more of a master device and target device of a serial bus interface when one or more signals are held in an invalid state. A hang timer monitors one or more operations of the serial bus when the serial bus is participating in a serial bus transfer. If the transfer does not end before the bus timeout value has been exceeded, the hang timer will issue a reset to the state machine forcing the state machine back to an idle state. The hang timer will also disable the serial bus drivers of the state machine, whereby the hang condition is corrected.

1 Claim, 5 Drawing Sheets

FREEING A SERIAL BUS HANG CONDITION BY UTILIZING DISTRIBUTED HANG TIMERS

BACKGROUND

1. Technical Field

The present invention generally relates to a serial bus interfaces and in particular to signals of serial bus interfaces.

2. Description of the Related Art

In a serial interface, such as an inter-integrated circuit (I2C) interface, occasionally conditions arise whereby a master device or a target device hold on to one or both signals within the serial interface. Multiple methods have been attempted to solve the problem of signal holds, or freeing the serial bus of hang conditions.

A first method utilized for freeing the serial bus of hang conditions comprises issuing a particular number of clocks with a data signal at a high. Issuing the number of clocks is not a successful method for freeing the serial bus of hang conditions. The clocks and data signals may be held low by a failing device, and the master may not be capable of driving the clocks and/or data. Another problem with the method of issuing a number of clocks with a data signal at a high state is simply driving clocks with data held at a certain state may cause erroneous data to be written to a targeted device given the operation held on the serial bus is a write at the time of the failure. An alternative method utilized for freeing a serial bus of hang conditions is for the supervising device to issue a reset signal to all devices attached to the bus; however, not all devices implement a dedicated reset input for such purposes.

SUMMARY OF ILLUSTRATIVE EMBODIMENTS

Disclosed are a method, a system and a computer program product for automatically detecting and correcting one or more hang conditions within one or more of a master device and target device of a serial bus interface when one or more signals are held in an invalid state. A hang timer monitors one or more operations of the serial bus when the serial bus is participating in a serial bus transfer. If the transfer does not end before the bus timeout value has been exceeded, the hang timer will issue a reset to the state machine forcing the state machine back to an idle state. The hang timer will also disable the serial bus drivers of the state machine, whereby the hang condition is corrected.

The above as well as additional objectives, features, and advantages of the present invention will become apparent in the following detailed written description.

BRIEF DESCRIPTION OF THE DRAWINGS

The invention itself, as well as advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
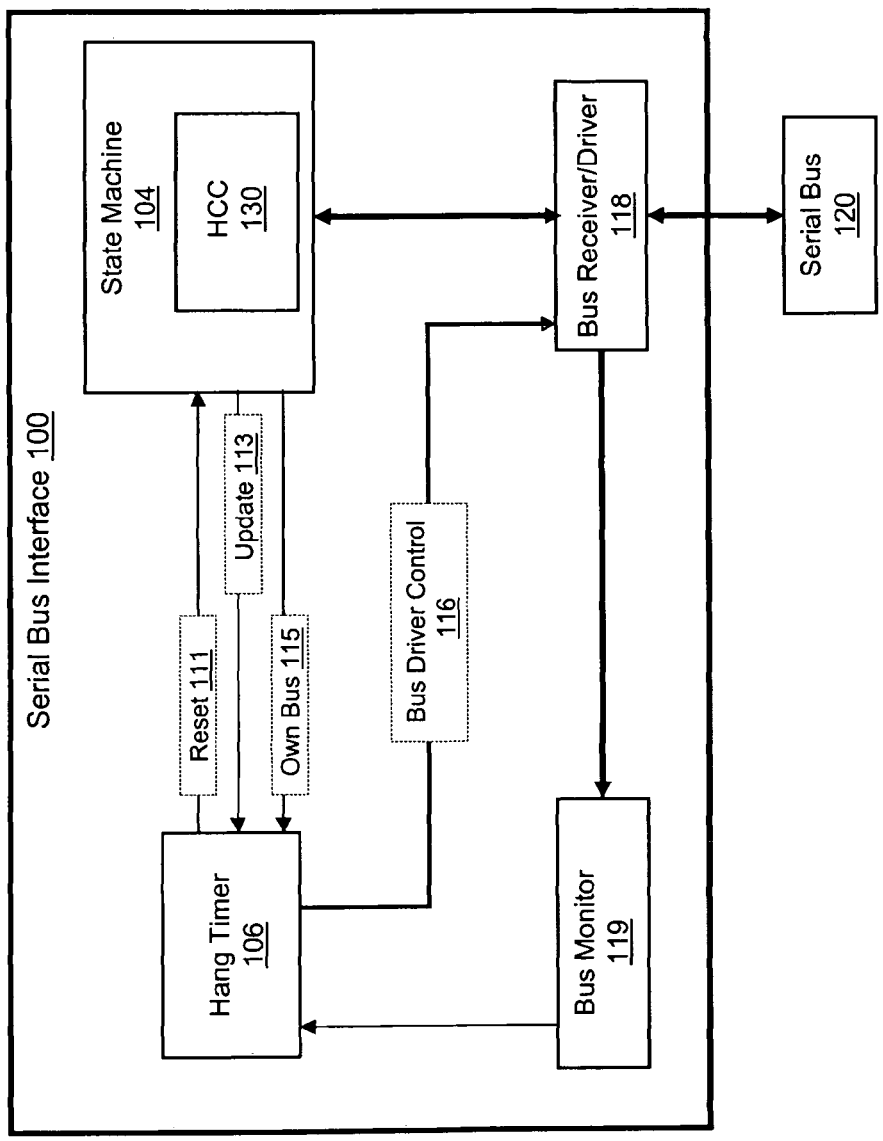
FIG. 1 provides a block diagram representation of an example serial bus interface within which the invention is practiced, according to one embodiment of the invention.

The illustrative embodiments provide a method, a system and a computer program product for automatically detecting and correcting one or more hang conditions within one or more of a master device and target device of a serial bus interface when one or more signals are held in an invalid state. A hang timer monitors one or more operations of the serial bus when the serial bus is participating in a serial bus transfer. If the transfer does not end before the bus timeout value has been exceeded, the hang timer will issue a reset to the state machine forcing the state machine back to an idle state. The hang timer will also disable the serial bus drivers of the state machine, whereby the hang condition is corrected.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, the "term timeout value" describes a period of elapsed time wherein the one or more signals are held in the invalid state With reference now to the figures, and beginning with FIG. 1, there is depicted a block diagram representation of a serial bus interface (SBI), as utilized within one embodiment. SBI 100 may be an inter-integrated circuit (I2C) serial bus interface. As illustrated, SBI 100 comprises at least one hang timer 106, serial bus state machine 104, serial bus monitor 119, and a serial bus driver and receiver 118. Serial bus monitor 119 monitors the serial bus 120 and informs hang timer 106 of the current state (i.e. start, stop, idle, etc.) of serial bus 120. SBI 100 may be associated with one or more of a master device and target device.

Within state machine 104 is the hang condition correction (HCC) utility. HCC utility 130 enables state machine 104 to perform a number of operations, whereby serial interface bus 100 is controlled. HCC utility 130 enables state machine 104 to manage when to send and receive data to and/or from SBI 100. One or more signals are transmitted to and/or from hang timer 106 and state machine 104. Reset signal 111 is issued by hang timer 106 to state machine 104. Update timer value signal 113 is transmitted by state machine 104 to adjust timer values of hang timer 106. Bus driver control signal 116 transmits signals for enabling and disabling of serial bus driver and receiver 118. HCC utility 130 enables hang timer 106 to dispatch bus driver control signal 116.

In one embodiment, HCC utility 130, of state machine 104, monitors one or more operations of a serial bus and informs hang timer 106 of when serial bus interface 100 is actively participating in a serial bus transfer by transmitting "own bus" signal 115. When own bus signal 115 is received by hang timer 106, one or more hang timer values are updated via update timer value signal 113. When SBI 100 is associated with a target device, update timer value signal 113 is transmitted to hang timer 106 as a result of commands received via serial bus 120 (as commands are issued by one or more master devices).

For simplicity of the description, the collective body of code that enables the various functions of SBI 100, and specifically hang timer 106 are referred to herein as HCC utility 130. Among the software code/instructions/logic provided by HCC utility 130, and which are specific to the invention, are: (a) code/logic for monitoring one or more operations of the serial bus, whereby one of the one or more operations is a serial bus transfer of the one or more master devices and the one or more target devices; (b) code/logic for associating a select master identification with a select master device of the one or more master devices; and (c) code/logic for associating a select address with a select target device of the one or more target device. According to the illustrative embodiment, when state machine 104 and/or hang timer 106 execute HCC utility 130, SBI 100 initiates a series of functional processes that enable the above functional features as well as additional features/functionality. These features/functionality are described in greater detail below within the description of FIGS. 2-5.

Figure 2:
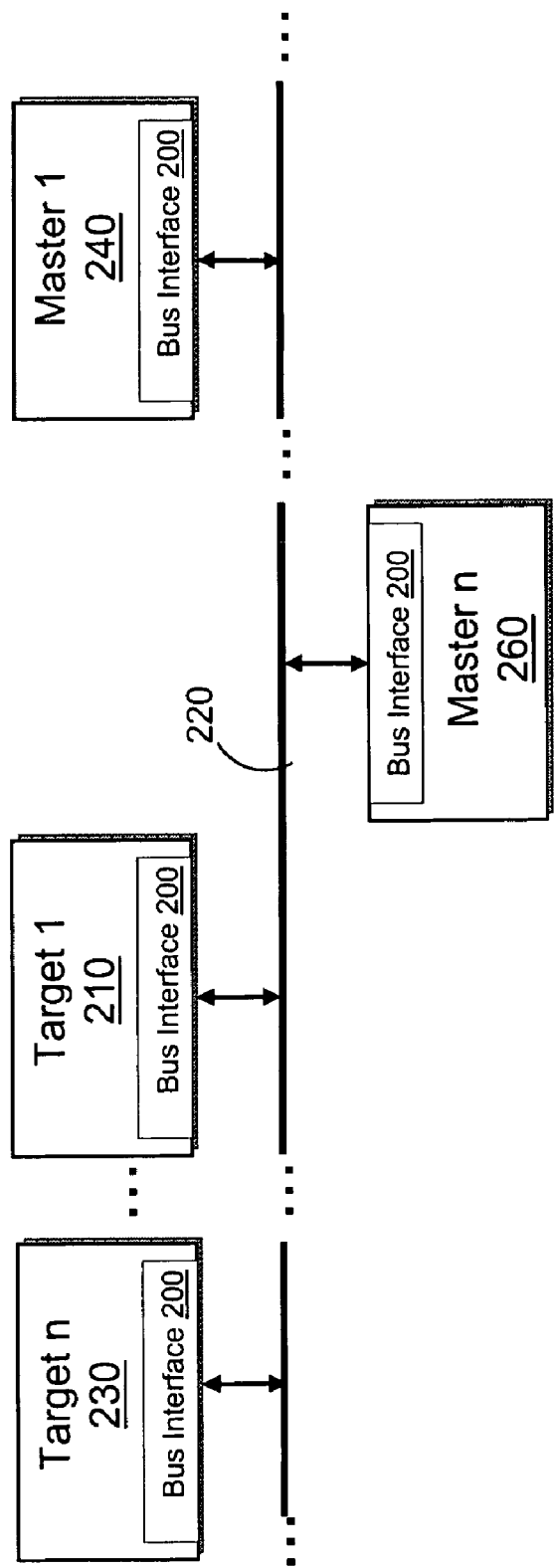
FIG. 2 illustrates an example serial bus with one or more master and target devices, in accordance with one embodiment of the invention.

With reference now to FIG. 2, which illustrates a serial bus associated with one or more master and target devices. Serial bus 220 comprises target device n 230, target device 1 210, master device 1 240, and master device n 260, whereby 'n', of target device n 230 and master device n 260, depicts a predefined number of target devices and/or master devices. Serial bus interface 200, similar to similar bus interface 100 of FIG. 1, is located within one or more of target device n 230, target device 1 210, master device 1 240, and master device n 260.

In one embodiment, the hang timer (106) of serial bus interfaces (200) monitors the time of each operation of the serial bus (220) when serial bus 220 is participating in a serial bus transfer. Participation in a serial bus transfer is depicted by an "own bus" signal (115 of FIG. 1). An "own bus" signal is transmitted when target device 1 210 is active in a serial bus transfer (on serial bus 220), and when the address of target device 1 210 is recognized. An "own bus" signal is also transmitted when master device 1 240 is actively driving one or more clocks. When the serial bus transfer is not completed before the timeout value of serial bus 220 has been exceeded, the hang timer transmits a reset signal. The reset signal (111 of FIG. 1), issued by the hang timer to the state machine (104 of FIG. 1) within bus interface 200, forces the state machine to an idle state and also disables one or more serial bus drivers (118 of FIG. 1).

In another embodiment, one or more master devices on a serial bus are associated with a unique pre-assigned identification (ID), prior to accessing any target device. One or more of target device n 230, target device 1 210, master device 1 240, and master device n 260 enable a table of timer registers whereby each entry in the table is associated with the assigned master and/or target device (i.e. one or more of target device n 230, target device 1 210, master device 1 240, and master device n 260). For master device 1 240 and master device n 260 the table of timer registers is a table of target timeout values in which master device 1 240 and master device n 260 has written (assigned) to target device n 230 and target device 1 210. For target device n 230 and target device 1 210 the table of timer registers is a table of timeout values indexed by the assigned ID of master device 1 240 and master device n 260. The select target device and the timeout value assigned to the select target device are detected by HCC utility 130.

In one embodiment, one or more tables are assigned to a select master device and a select target device. A first table is assigned to the select master device (master device 1 240) of one or more master devices. A second table is assigned to the select target device (target device 1 210) of the one or more target devices. The first table stores one or more timeout values of the select target associated with the address of the select target. The second table stores one or more timeout values for the select target associated with one or more master identifications.

In one embodiment, an initialization of the device mastering the serial bus is enabled. Master device n 260 receives the assigned ID during initialization and selects the target device, target device n 230. The timeout value programmed to target device n 230 is detected by master device n 260. An operation is initiated between target device n 230 and master n 260 when master device n 260 is identified by target device n 230 via one or more identification bytes. Target device n 230 is accessed by master device n 260 via a read/write command.

In one embodiment, one or more hang conditions are automatically detected and corrected within a serial bus interface of one or more master devices and one or more target devices on a serial bus when one or more signals are held in an invalid state. The selected target device (target device n 230) utilizes the "greatest programmed timer" to time the master device address and ID phases. Target device n 230 utilizes the greatest programmed timer to identify the accessing device, master device n 260. When a timeout occurs while target device n 230 is attempted to be accessed, target device 230 will disable the serial bus drivers within bus interface 200 of the operating device (target device 230) and reset the serial bus state machine, of target device 230, back to idle. For the remainder of the bus operation, target device n 230 will use the ID of master device n 260 to select the time out value programmed into master device n 260 for timing the bus operation. In the event that a bus transfer does not complete in time (a bus hang condition is detected) target device n 230 will reset the internal state machine (within bus interface 200 of target device n 230) and release the bus drivers of bus interface 200, thereby correcting the hang condition.

In one embodiment, master device n 260 utilizes a default hang time to time the ID and timeout initialization operations. Master device n 260 utilizes a previously assigned hang time, written to target device n 230, to time bus operations. When a default time is engaged, the default period of time is a predetermined amount of time or a number of clock periods. Each target device (target device n 230 and target device 1 210) is requested to respond to the ID and timeout initialization commands within the default period of time (i.e. target devices must be able to store the ID and timeout values immediately when requested). Target device n 230 and target device 1 210 are also requested to provide to the master device a timeout value within the default period of time. The timeout values are written and/or read during initialization, afterwards the timeout values written to the table of timer registers, or greatest timeout values, are utilized, whereby one or more of a single timeout value, a unique timeout value, and a clock defined timeout value are assigned to each of the one or more target devices In another embodiment, target device 1 210 and target device n 230 enables a register that contains a pre-assigned timeout value. The timeout value is pre-assigned during manufacturing or updatable by a Micro-Processor Unit (MPU). The pre-assigned address is readable by an operator during initialization of Master device n 260 (or master device 1 240) in order to define the maximum hang time required by the particular target device. Alternatively, the timer value is defined as an integral number of bus clock periods, thereby not requiring a pre-assigned timeout value. Further, the timeout value is determined by the bus speed. The timeout value changes as the bus speed changes.

Figure 3:
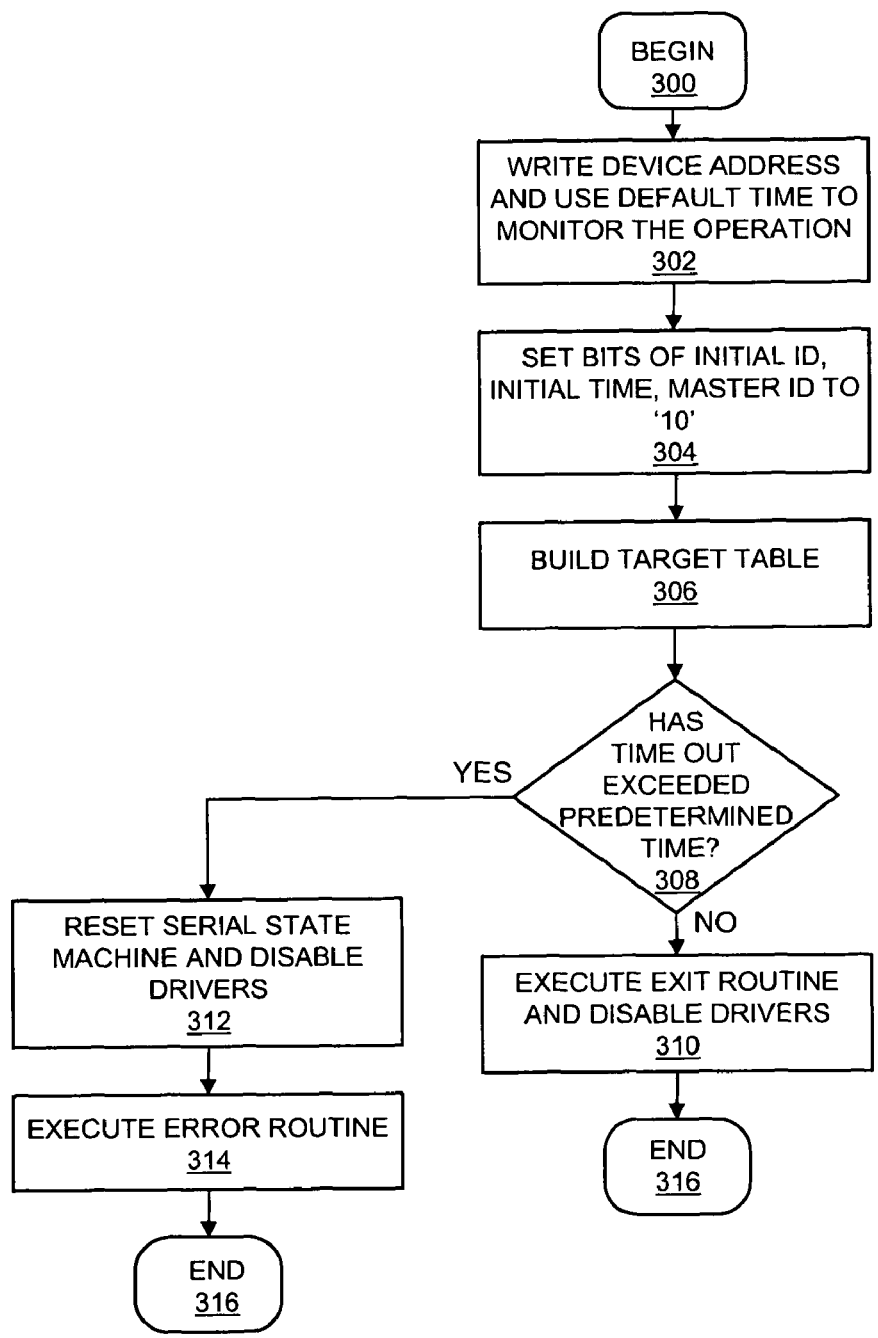
FIG. 3 is a flow chart illustrating the processes for master device identification initialization; according to one embodiment of the invention.
Figure 4:
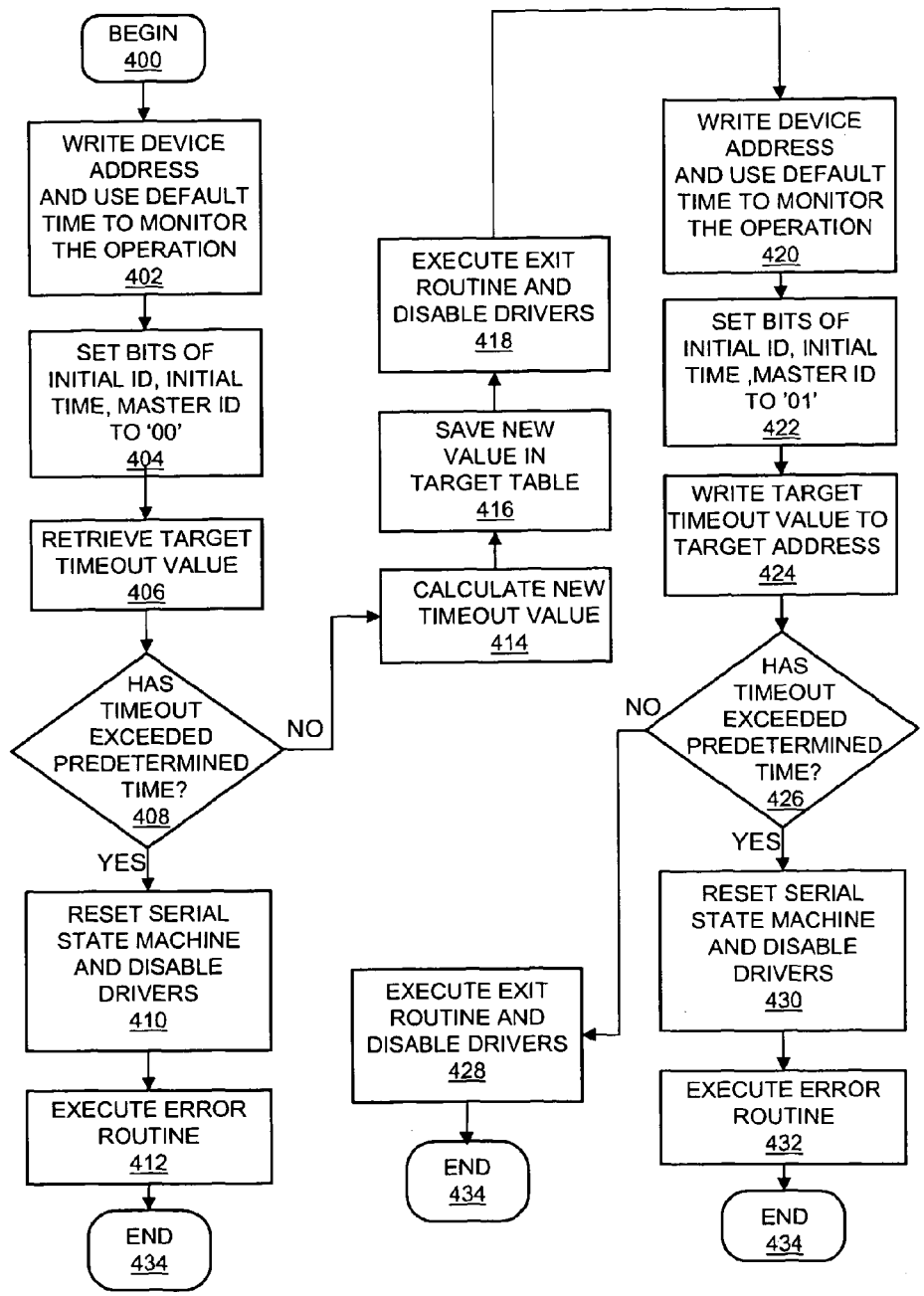
FIG. 4 is a flow chart illustrating the processes for master device timeout initialization, in accordance with one embodiment of the invention.
Figure 5:
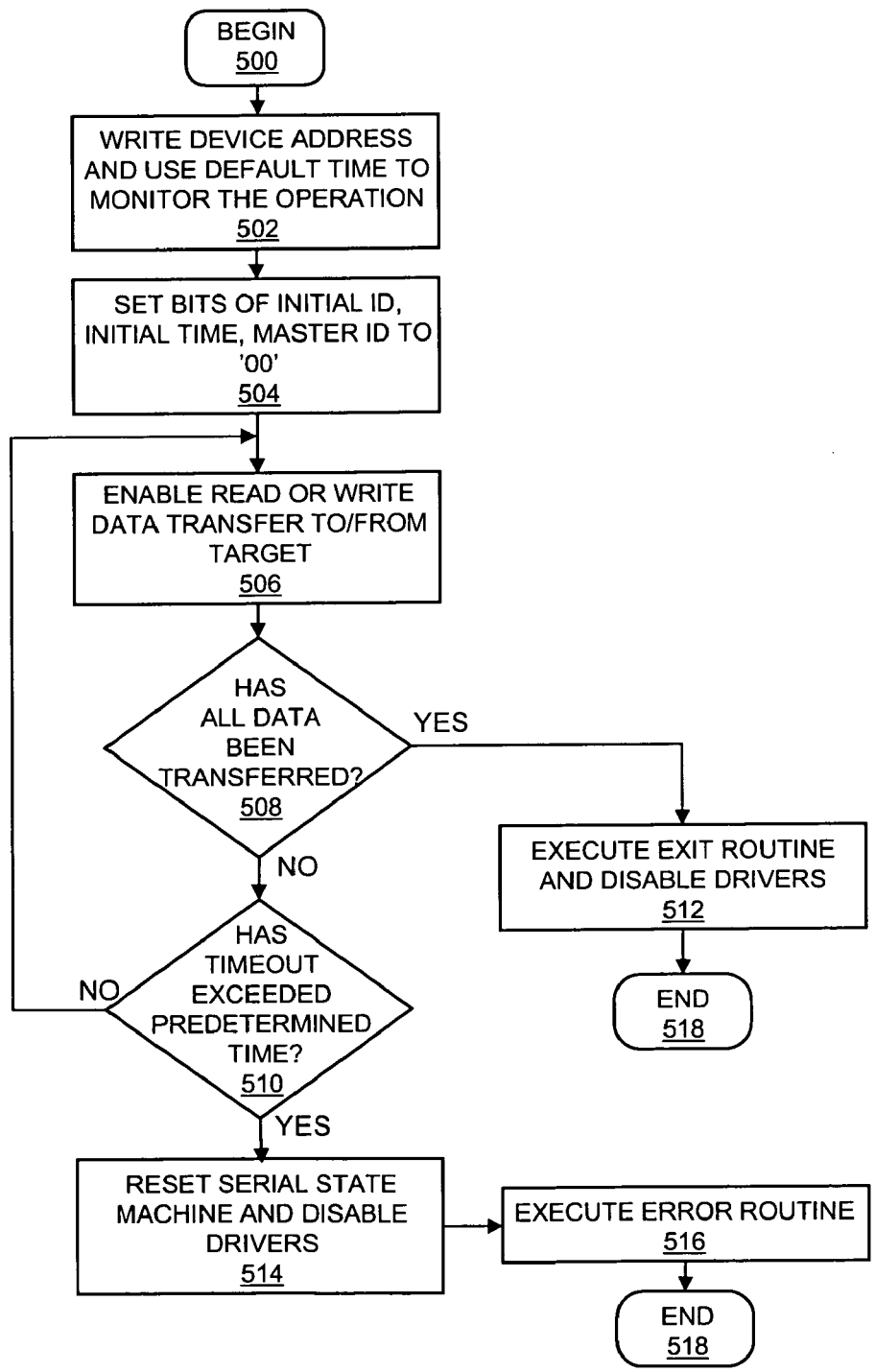
FIG. 5 is a flow chart illustrating the processes for master device operational mode; according to one embodiment of the invention.

FIGS. 3-5 are flow charts illustrating various methods by which the above processes of the illustrative embodiments are completed. Although the methods illustrated in FIGS. 3-5 may be described with reference to components shown in FIGS. 1-2, it should be understood that this is merely for convenience and alternative components and/or configurations thereof can be employed when implementing the various methods. Key portions of the methods may be completed by HCC utility 130 within SBI 100 (FIG. 1) and controlling specific operations and components of SBI 100, and the methods are thus described from the perspective of both SBI utility 130 and SBI 100.

FIG. 3 depicts the process of for master device identification (ID) initialization. The process of FIG. 3 begins at initiator block 300 and proceeds to block 302, at which the device address is written and a default period of time is utilized to monitor the bus operation. The master device is initialized at block 304, whereby the initial ID, initial time, and master device ID is set to '10'. At block 306 a table of timeout values indexed by the assigned ID of master device for the associated target device is built.

A decision is made, at block 308, whether the timeout has exceeded the predetermined period of time (has a bus hang condition occurred). If the timeout condition has not exceeded the predetermined period of time, the process continues to block 310. At block 310 bus transfer, or routine, is exited and the drivers of the target device are disabled. If the timeout condition has exceeded the predetermined period of time the serial state machine, of the target device is reset, and the bus drivers are disabled, at block 312. At block 314 an error routine is executed. The process ends at block 316.

The process of FIG. 4 depicts the method for master device timeout initialization. FIG. 4 process begins at initiator block 400 and proceeds to block 402, at which the master device writes the target device address and utilizes the default time to monitor the operation. At block 404 the initial ID, initial time, and master ID bits are set to '00'. The target timeout value is retrieved at block 406. A decision is made, at block 408, whether the timeout period of time has exceeded the predetermined period of time. If the timeout has exceeded the predetermined period of time the process continues to block 410. At block 410 the serial machine of the target device is reset and the drivers are disabled. An error routine is executed at block 412. If the timeout has not exceeded the predetermined period of time, the process continues to block 414. At block 414 the new timeout value is calculated. The new timeout value is saved in a table of target registers, at block 416 that stores one or more timeout values for the select target associated with one or more master identifications. The operation, or routine, is exited, at block 418, and the drivers of the target device are disabled.

At block 420 the target device address is written, and a default time is utilized to monitor the operation, or routine. The bits of initial ID, initial time, and master ID are set to '01', at block 422. At block 424, the target device timeout value is written to the target device address. A decision is made, at block 426, whether the timeout period of time has exceeded the predetermined period of time. If the timeout period of time has not exceeded the predetermined period of time, the process continues to block 428. At block 428 the operation (or routine) is exited and the drivers of the target device are disabled. If the timeout period of time has been exceeded, the process continues to block 430. At block 430 the serial machine of the target device is reset, and the drivers of the target device are disabled. An exit routine is executed at block 432. The process ends at block 434.

FIG. 5 depicts the process for master device operations (operational mode). The process of FIG. 5 begins at initiator block 500 and proceeds to block 502, at which the master device writes the target device address and utilizes the default time to monitor the operation. At block 504 the bits of initial ID, initial time, and master ID are set to '00'. A read or write data transfer to and/or from the target device is enabled at block 506.

A decision is made, at block 508, whether all data has been transferred during the serial bus operation. If all data has been transferred, the process continues to block 512. At block 512 an exit routine is executed and one or more drivers of the target device are disabled. The process ends at block 518. If all data has not been transferred at block 508, the process continues to block 510. At block 510 a decision is made whether the timeout period (value) has exceeded the predetermined period of time. If the timeout period has not exceeded the predetermined period of time, the process continues to block 506. If the timeout period has exceeded the predetermined period of time, the process continues to block 514. At block 514 the serial state machine of the target device is reset, and the drivers of the serial bus state machine are disabled. An error routine is executed at block 516. The process ends at block 518.

In the flow charts above, one or more of the methods are embodied in a computer readable storage medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As will be appreciated by one skilled in the art, the present invention may be embodied as a method, system, and/or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," "logic", or "system." Furthermore, the present invention may take the form of a computer program product on a computer-usable storage medium having computer-usable program code embodied in or on the medium.

As will be further appreciated, the processes in embodiments of the present invention may be implemented using any combination of software, firmware, microcode, or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The medium may be electronic, magnetic, optical, electromagnetic, infrared, or semiconductor system (or apparatus or device) or a propagation medium. Further, the medium may be any apparatus that may contain, store, communicate, propagate, or transport the program for use by or in connection with the execution system, apparatus, or device. The methods of the invention may be practiced by combining one or more machine-readable storage devices containing the code according to the described embodiment(s) with appropriate processing hardware to execute the code contained therein.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for automatically detecting and correcting one or more hang conditions within a serial bus interface of one or more master devices and one or more target devices on a serial bus when one or more signals are held in an invalid state, the method comprising:

monitoring one or more operations of the serial bus, wherein one of the one or more operations is a serial bus transfer of the one or more master devices and the one or more target devices;

associating a select master identification with a select master device of the one or more master devices;

associating a select address with a select target device of the one or more target device;

assigning a first table to the select master device of the one or more master devices, and assigning a second table to the select target device of the one or more target devices, when the first table stores one or more timeout values of the select target associated with the address of the select target, and the second table stores one or more timeout values for the select target associated with one or more master identifications;

when the timeout value is a period of elapsed time wherein the one or more signals are held in the invalid state, assigning one or more timeout values to the one or more target devices on the serial bus, wherein one or more of a single timeout value, a unique timeout value, and a clock defined timeout value are assigned to each of the one or more target devices;

transmitting a master identification request to the select target device, wherein the master identification request is a request to initiate the serial bus transfer;

associating the select target device to the select master device during a serial bus transfer, wherein the select master device is identified by a select master identification;

detecting the select target device and the timeout value assigned to the select target device;

when the select master device accesses the select target device via one of a read and write command during a serial bus transfer, detecting an amount of time elapsed between an initial access of the select target device by the select master device and recognition of the select master device by the select target device;

when the select target device accepts the select master identification during the serial bus transfer, storing the select target address for the select target device in the first table; and storing the select master identification for the select master device in the second table; and when the timeout value of the select target device of the serial bus transfer is exceeded, disabling the serial bus drivers of the select target device; and setting the state machine of the select target device to idle.

* * * * *